United States Patent
Chen et al.

(10) Patent No.: US 12,430,057 B2
(45) Date of Patent: Sep. 30, 2025

(54) DYNAMIC MULTILEVEL MEMORY SYSTEM

(71) Applicant: Intel Corporation, Santa Clara, CA (US)

(72) Inventors: Wei P. Chen, Portland, OR (US); Andrew M. Rudoff, Boulder, CO (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 17/710,796

(22) Filed: Mar. 31, 2022

(65) Prior Publication Data

US 2022/0229575 A1 Jul. 21, 2022

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC .... G06F 3/0604; G06F 3/0647; G06F 3/0679; G06F 9/5016
See application file for complete search history.

(56) References Cited

U.S. PATENT DOCUMENTS

| 8,612,676 B2 | 12/2013 | Dahlen et al. |
| 8,830,716 B2 | 9/2014 | Feekes |
| 9,600,413 B2 | 3/2017 | Ray et al. |
| 10,503,658 B2 * | 12/2019 | Basu .................. G06F 11/3433 |
| 2013/0268728 A1 * | 10/2013 | Ramanujan ......... G06F 12/0806 711/143 |
| 2014/0082262 A1 * | 3/2014 | Nachimuthu ....... G06F 12/0246 711/103 |
| 2015/0227469 A1 | 8/2015 | Zyulkyarov et al. |
| 2016/0179382 A1 * | 6/2016 | Blagodurov ............ G06F 3/061 711/154 |
| 2017/0177482 A1 | 6/2017 | Greenspan |
| 2020/0104275 A1 | 4/2020 | Sen et al. |
| 2020/0322287 A1 | 10/2020 | Connor et al. |
| 2020/0379922 A1 | 12/2020 | Kumar et al. |
| 2021/0014324 A1 | 1/2021 | Chilikin et al. |
| 2021/0349820 A1 | 11/2021 | Kutch et al. |

* cited by examiner

*Primary Examiner* — Larry T MacKall
(74) *Attorney, Agent, or Firm* — Compass IP Law PC

(57) ABSTRACT

A system can dynamically migrate memory pages from near memory to far memory during runtime. A system basic input output system (BIOS) can program a first memory address space of size P and a second memory address space of size P to a near memory (NM) space of size (N) and a far memory (FM) space of size (M), where P equals N+M. For the first memory address space, the OS can manage the NM space and the FM space as a flat memory space with an address space of size P available. For the second memory address space, the OS can manage the NM space as a NM cache for FM, with an address space of size M available.

18 Claims, 8 Drawing Sheets

DYNAMIC MULTILEVEL MEMORY SYSTEM

FIELD

Descriptions are generally related to memory systems, and more particular descriptions are related multilevel memory systems.

BACKGROUND

Main system memory or the operating memory for the compute resources of a computing device can include memory resources having different access latencies. The memory resources can be differentiated based on access latency. Depending on the system architecture, the main system memory can be implemented as a single level memory (1LM) that includes devices having different access latencies, but are mapped in a flat configuration as contiguous address space. Alternatively, the system memory can be managed as a two level memory (2LM) having a system capacity equal to the capacity of the memory resources having longer access latency, and the memory resources having the shorter access latency operating as a cache for the second level of memory.

Traditionally, the configuration of the system memory is set at boot time and static at runtime. Thus, once the BIOS (basic input/output system) configures the memory management with the 1LM or 2LM configuration, the operating system will manage the memory in accordance with the configuration selected. However, different system workloads can better utilize one configuration over the other. When a system configuration is selected that does not match the preferred operation of the workload, it can negatively impact system performance.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

In contrast to a traditional system where selecting between a 1LM (single level memory) architecture and a 2LM (two level memory) architecture is a static boot time option, a system can enable 1LM and 2LM regions to be dynamically configured during system runtime. The BIOS (basic input/output system) can preconfigure the computing system at boot time for both 1LM configuration and 2LM configuration. The BIOS can preconfigure for both configuration modes at the same time by presenting both address spaces to the operating system (OS). Thus, instead of 2LM either being on or off with the OS and system software from being required to utilize memory according to a static boot time configuration, the system can select between different memory space configurations at runtime based on the workload.

As described herein, a system can dynamically migrate memory pages from near memory to far memory during runtime. A system basic input output system (BIOS) can program a first memory address space of size P and a second memory address space of size P to a near memory (NM) space of size (N) and a far memory (FM) space of size (M), where P equals N+M. For the first memory address space, the OS can manage the NM space and the FM space as a flat memory space with an address space of size P available. For the second memory address space, the OS can manage the NM space as a NM cache for FM, with an address space of size M available.

Figure 1:
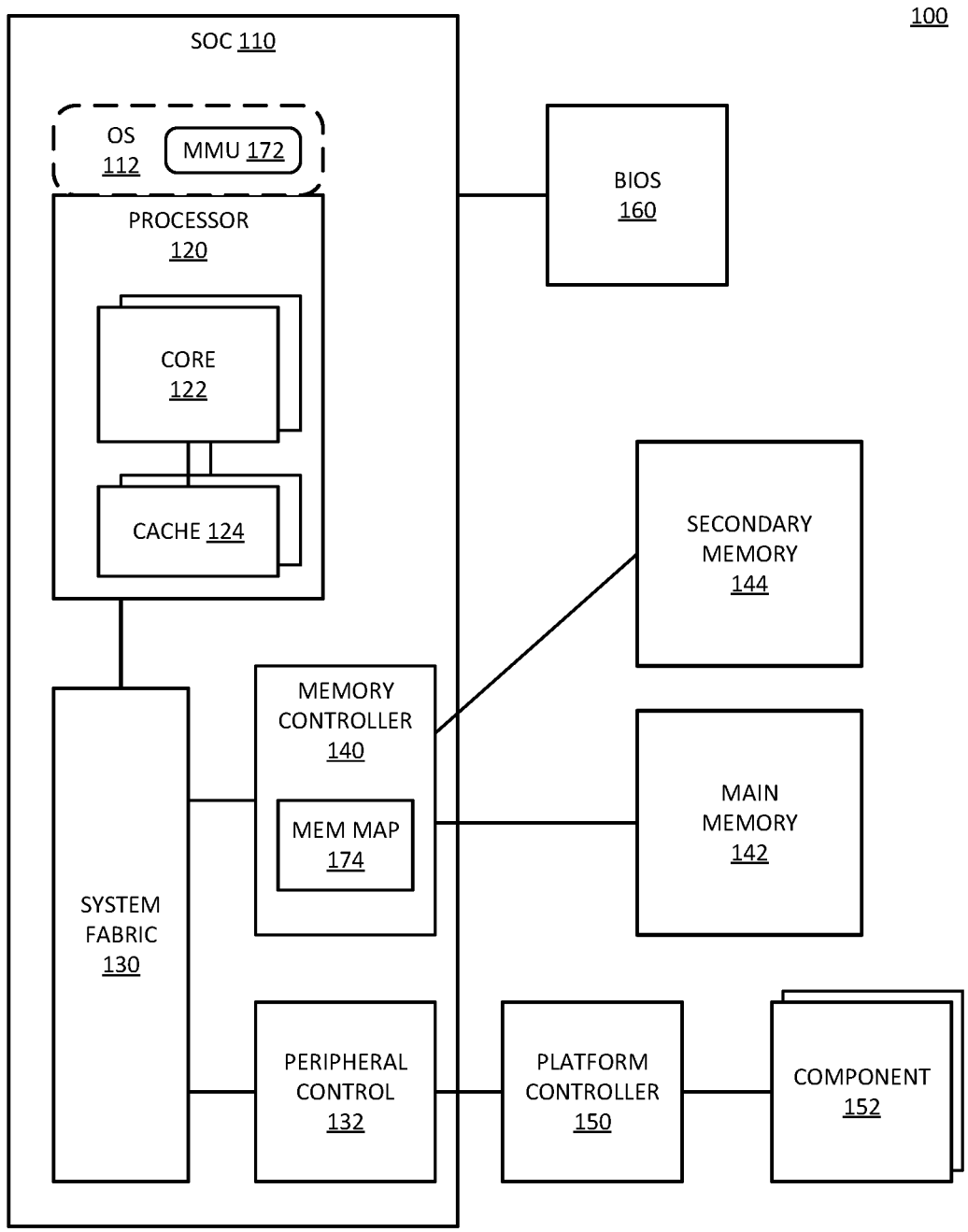
FIG. 1 is a block diagram of an example of a multilevel memory system.

FIG. 1 is a block diagram of an example of a multilevel memory system. System 100 includes SOC (system on a chip) 110, which represents an integrated processor package, which includes processor cores and integrated controllers. SOC 110 represents an example of a processor die or a processor SOC package. SOC 110 can represent a central processing unit (CPU), a graphics processing unit (GPU), or other processing device.

SOC 110 includes processor 120, which can include one or more cores 122 (i.e., a single core processor or a multicore processor) to perform the execution of instructions. In one example, cores 122 include cache 124, which represents cache resources on the processor side, and includes cache control circuits and cache data storage. Cache 124 can represent any type of cache on the processor side. In one example, individual cores 122 include a local cache 124 that is not shared with other cores. In one example, multiple cores 122 share one or more caches 124.

In one example, processor 120 represents compute resources on which a host operating system (OS) is executed. In a processor such as a graphics processor or accelerator, the processor does not necessarily execute the host OS, but can execute a control process to manage the device. OS 112 represents an operating system or program or agent executed by processor 120. OS 112 can include configuration identifying the memory resources available in system 100 and how system 100 is configured for use of the memory resources.

In one example, SOC 110 includes system fabric 130 to interconnect components of the processor system. System fabric 130 can be or include interconnections between processor 120 and peripheral control 132 and one or more memory controllers such as memory controller 140. System fabric 130 enables the exchange of data signals among the components of SOC 110. While system fabric 130 is generically shown connecting the components, it will be understood that system 100 does not necessarily illustrate all component interconnections. System fabric 130 can represent one or more mesh connections, a central switching mechanism, a ring connection, a hierarchy of fabrics, or other interconnection topology.

In one example, SOC 110 includes one or more peripheral controllers 132 to connect to peripheral components or devices that are external to SOC 110. In one example, peripheral control 132 represents hardware interfaces to platform controller 150, which includes one or more components or circuits to control interconnection in a hardware platform or motherboard of system 100 to interconnect peripherals to processor 120. Components 152 represent any type of chip or interface or hardware element that couples to processor 120 via platform controller 150.

System 100 includes BIOS (basic input output system) 160, which represents a boot controller for system 100. BIOS 160 can manage the bootup of system 100 until system configuration is verified and OS 112 can be executed. In one example, BIOS 160 verifies the capacity of memory resources available through main memory 142 and secondary memory 144. BIOS 160 can configure OS 112 or other application or software in system 100 with memory configuration information.

In one example, SOC 110 includes memory controller 140, which represents control logic to manage access to memory resources, including main memory 142 and secondary memory 144. In one example, memory controller 140 represents an integrated memory controller (iMC) implemented as hardware circuits and software/firmware control logic in SOC 110. Main memory 142 and secondary memory 144 represent different levels of system memory. While system 100 illustrates both as connecting to memory controller 140, SOC 110 can include separate controllers for different types of memory or different links to memory devices.

In one example, main memory 142 includes volatile memory, such as DRAM (dynamic random access memory). Volatile memory has indeterminate state if power is interrupted to the system. In one example, main memory 142 includes a double data rate (DDR) volatile memory device. In one example, secondary memory 144 includes nonvolatile memory (NVM), which has determinate state even if power is interrupted to the system. There can be an overlap of memory types between main memory 142 and secondary memory 144. Whether it is due to the link or connection, due to the memory technology, or due to a combination of the two, secondary memory 144 has a longer access time than main memory 142.

In one example, secondary memory 144 includes a three dimensional crosspoint (3DXP) memory, such as a memory with cells based on a chalcogenide glass technology. A specific example of 3DXP includes an INTEL Optane memory, available from Intel Corporation. In one example, secondary memory 144 includes NVM coupled to SOC 110 over a peripheral connection, such as PCIe (peripheral connection interface express), NVMe (nonvolatile memory express), or CXL (compute express link).

PCIe can be in accordance with PCI Express Base Specification Revision 4.0, originally released in October 2017 by PCI-SIG, PCI Express Base Specification Revision 5.0, originally released in May 2019 by PCI-SIG, or variations. NVMe can be in accordance with NVMe Express Base Specification, originally released in June 2019 by NVM Express Inc., or a variation.

CXL can refer to a memory device connected with a CXL link in accordance with specification available from the Compute Express Link (CXL) Consortium, such as Compute Express Link Specification, Rev. 2.0, Ver. 1.0, published Oct. 26, 2020. Connection with a CXL link can allow for onlining and offlining memory resources, for example, for memory pooling or other exposing of memory address space from a shared resource.

In one example, reference to NVM media can refer to a block addressable memory device, such as NAND (not AND based gates) or NOR (not OR based gates) flash technologies. In one example, the NVM media can includes a future generation nonvolatile device, such as a three dimensional crosspoint memory device, other byte addressable or block addressable nonvolatile memory devices. In one example, the NVM media can include a nonvolatile media that stores data based on a resistive state of the memory cell, or a phase of the memory cell. In one example, the memory device can use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random-access memory (FeTRAM), magnetoresistive random-access memory (MRAM) memory that incorporates memristor technology, or spin transfer torque (STT)-MRAM, or a combination of any of the above, or other memory.

Typically, secondary memory 144 has a higher capacity than main memory 142. The ratio of secondary memory 144 to main memory 142 will vary by system. Some implementations of system 100 can have a ratio of approximately 1:2 main memory to secondary memory. The ratio can be approximately 1:1, or can be higher, such as 1:4, 1:8, or other ratio of main memory to secondary memory. In one example, main memory 142 and secondary memory 144 can be configured for one of two different memory modes. In a first mode, the memory resources are used in a 1LM configuration or a flat memory, where BIOS 160 exposes to memory controller 140 and OS 112 all capacity of both memories, and the OS can perform to the entire capacity as system memory. In a second mode, the memory resources are used in a 2LM configuration, where BIOS 160 exposes to OS 112 the capacity of secondary memory 144 as the system memory, and memory controller 140 can use main memory 142 as a cache for secondary memory 144.

In one example, OS 112 includes MMU (memory management unit) 172, which represents a memory management module of the operating system. MMU 172 can identify to OS processes and to applications executed under OS 112 what memory resources are available. In one example, memory controller 140 includes memory (MEM) map 174 to indicate the mapping of resources available from main memory 142 and secondary memory 144. With memory map 174, memory controller 140 can be configured to know when to access memory directly in a 1LM configuration, or to first access main memory 142 as cache and then go to secondary memory 144 in a 2LM configuration.

In one example, BIOS 160 programs MMU 172 and memory map 174 at boot time with configuration for main memory 142 and secondary memory 144. Instead of programming system 100 for either a 1LM configuration or a 2LM configuration, BIOS 160 programs system 100 with address space for both a 1LM configuration and for a 2LM configuration. For example, BIOS 160 can program system 100 with one address space that can be used for a 1LM configuration, and program system 100 with a duplication of the address space that can be used for a 2LM configuration.

With a duplication of address space, MMU 172 can see the available memory space as being both the 1LM configuration space as well as the 2LM configuration space, while having a maximum available memory of only the total memory capacity available. Memory controller 140 can manage the application of 1LM memory and 2LM configuration based on memory map 174 to implement the appropriate configuration for selected portions of memory.

With a dynamic, flexible memory configuration in system 100, OS 112 can allocate different workloads for use of memory in accordance with 1LM or 2LM, depending on the performance characteristics of the workload. In contrast to a traditional, fixed configuration, system 100 can match the memory configuration for the workload, and do so on a workload by workload basis. Thus, a workload that is not cache friendly (e.g., because of cache thrashing that will expose the longer access time of the secondary memory) can be limited to a 1LM memory space instead of a 2LM space.

It will be understood that by having BIOS 160 program multiple address ranges for the memory resources, system 100 can dynamically switch between 1LM and 2LM configurations without needing hardware changes. Rather the dynamic memory configuration can be implemented transparently to hardware, with the understanding that memory controller 140, which is a hardware component, understands the memory configuration to implement the 1LM and 2LM configurations.

Reference to configuration of the memory mode can include 1LM and 2LM configuration options, such as region start/end address and region size. Traditionally, such configuration parameters are static boot time settings that the BIOS programs. In system 100, BIOS presents both 1LM and 2LM configurations to OS 112, and the OS can assign any granularity address regions between 1LM and 2LM configurations. In one example, system 100 allocates the address regions as a multiple of OS pages. Such an implementation provides simplicity for OS 112 during runtime. The allocation by page is not required, and can be based on any memory region. Allocation by page size can be implemented by pre-allocating a virtual or non-existent memory region at boot time and using the region at runtime as a 1LM or 2LM proxy home.

Figure 2:
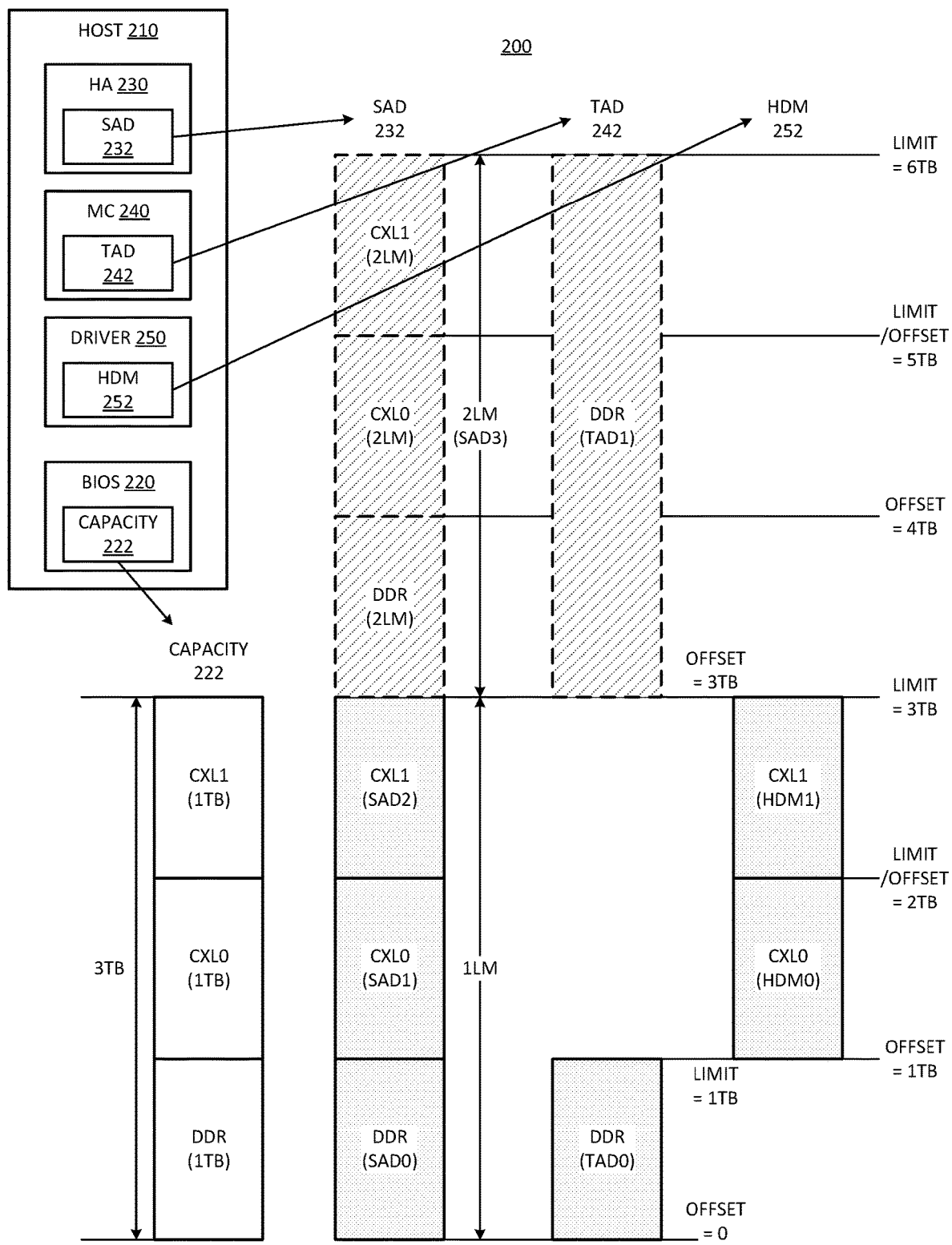
FIG. 2 is a block diagram of an example of a system for dynamic 2LM.

FIG. 2 is a block diagram of an example of a system for dynamic 2LM. System 200 represents a system in accordance with an example of system 100. Host 210 represents a host hardware platform, which can include an SOC. System 200 does not illustrate specific elements including processing components in detail.

Host 210 includes BIOS 220 to manage boot operation of system 200. In one example, BIOS 220 has a view or a representation of system memory resources, represented as capacity 222. Capacity 222 refers to the hardware memory resources available in system 200 or the actual or real physical memory available in system 200 for host 210.

As a non-limiting example, simply for purposes of illustration, consider that capacity 222 represents 3 TB (terabytes) of memory resources in system 200. The example specifically illustrates 1 TB of DDR or volatile memory, and 2 TB available as a memory pool. The 1 TB of DDR memory can be referred to as native memory, referring to memory populated on the platform of host 210. The memory pool is illustrated as 1 TB of CXL0 and 1 TB of CXL1, which represent memory resources available from different CXL links.

By mapping 1LM and 2LM to overlap the same physical space, both configurations can be available in the system. However, it will be understood that a physical address space can only be used for either the 1LM configuration or the 2LM configuration at a time. System 200 can map the physical address space to either 1LM or 2LM, and can map the same physical space to both, but can only use a physical address space in one mapping at a time. Thus, if physical memory space is allocated to 1LM, it is excluded from the 2LM address space.

In one example, BIOS 220 programs host 210 with virtual address space that is twice the physical memory space represented by capacity 222. As such, system 200 can configure the hardware (e.g., memory controller 240) with both configurations, and allow the software (e.g., the OS or a program or application running under the OS) to manage the space. The software can dynamically determine to use or not use address space. To manage the address space, the software needs to know that both address spaces exist and that they map to the same physical address space.

To configure the hardware for twice the address space, in one example, BIOS 220 configures the source address decoder (SAD) and the target address decoder (TAD) to map to the same physical resources. In one example, BIOS 220 programs SAD 232 of home agent (HA) 230 or other software agent or program or the operating system with memory configuration information. In one example, BIOS 220 programs TAD 242 of memory controller (MC) 240 with memory configuration information.

For purposes of the following description, consider that the DDR memory capacity is near memory (NM) and the CXL capacity (CXL0 and CXL1) are far memory (FM). In one example, BIOS 220 programs SAD 232 with a first region of size N for the NM, a second region of size M for the FM, and a third region of size P for a combination of the NM and the FM. The second region of size M can be considered generally, and can be separated as different regions based on how many FM components are available. For example, the system can have components of capacity M0, M1, M2, . . . , which combine to capacity M. In one example, BIOS 220 programs TAD 242 with a first region of size N for the NM, and a second region of size P, the second region having an address offset equal to P.

The different memory resources can have different uses. In one example, when system 200 is programmed for a standard 2LM configuration, the system will have only the FM capacity as system memory, and memory controller 240 will first access NM, and then access FM if there is a cache miss in NM. In one example, system 200 can implement a flat 2LM configuration, where the system has access to NM+FM capacity, and memory controller 240 can manage access to both the DDR channel and the far memory devices as system memory.

Referring specifically to the illustration of system 200, in one example, BIOS 220 programs SAD 232 with four distinct regions for a flat 2LM configuration with a 1:2 ratio: Region 0 (SAD0), Region 1 (SAD1), Region 2 (SAD2), and Region 3 (SAD3). SAD0 represents address space 0—1 TB and is mapped to the native channel DDR. SAD1 represents address space 1—2 TB and is mapped to CXL0. SAD2 represents address space 2—3 TB and is mapped to CXL1. SAD3 represents virtual address space 3—6 TB, which is not mapped to a separate physical memory space. Instead, SAD3 can be used as a flat 2LM (flat2LM) and 1LM region proxy at runtime. SAD3 can be configured as a 2LM region in SAD and have its decoding targets programmed to native DDR channels. In one example, BIOS 220 programs TAD 242 during boot with two TAD regions: TAD0 and TAD1. In one example, TAD0 has a limit of the native DDR channel, and thus has an offset of 0 and a limit of 1 TB. In one example, TAD1 has an offset of 3 TB and has a limit of 3 TB.

Host 210 can include driver 250, which represents one or more drivers or agents that can manage a link to a device off host 210. More specifically, driver 250 can represent a driver that manages a CXL link. In one example, driver 250 includes HDM (host-managed device memory) 252, which represents a view of the links to external memory. In one example, HDM 252 can represent CXL0 as an HDM0 address range with an offset of 1 TB and a limit of 2 TB, and represent CXL1 as an HDM1 address range with an offset of 2 TB and a limit of 3 TB. For the dynamic 2LM region where TAD 242 maps the entire region as memory, the host OS can send 2LM traffic to the memory controller, which first checks near memory (TAD0), and then sends out the request to the proper CXL address if there is a near memory cache miss.

Figure 3:
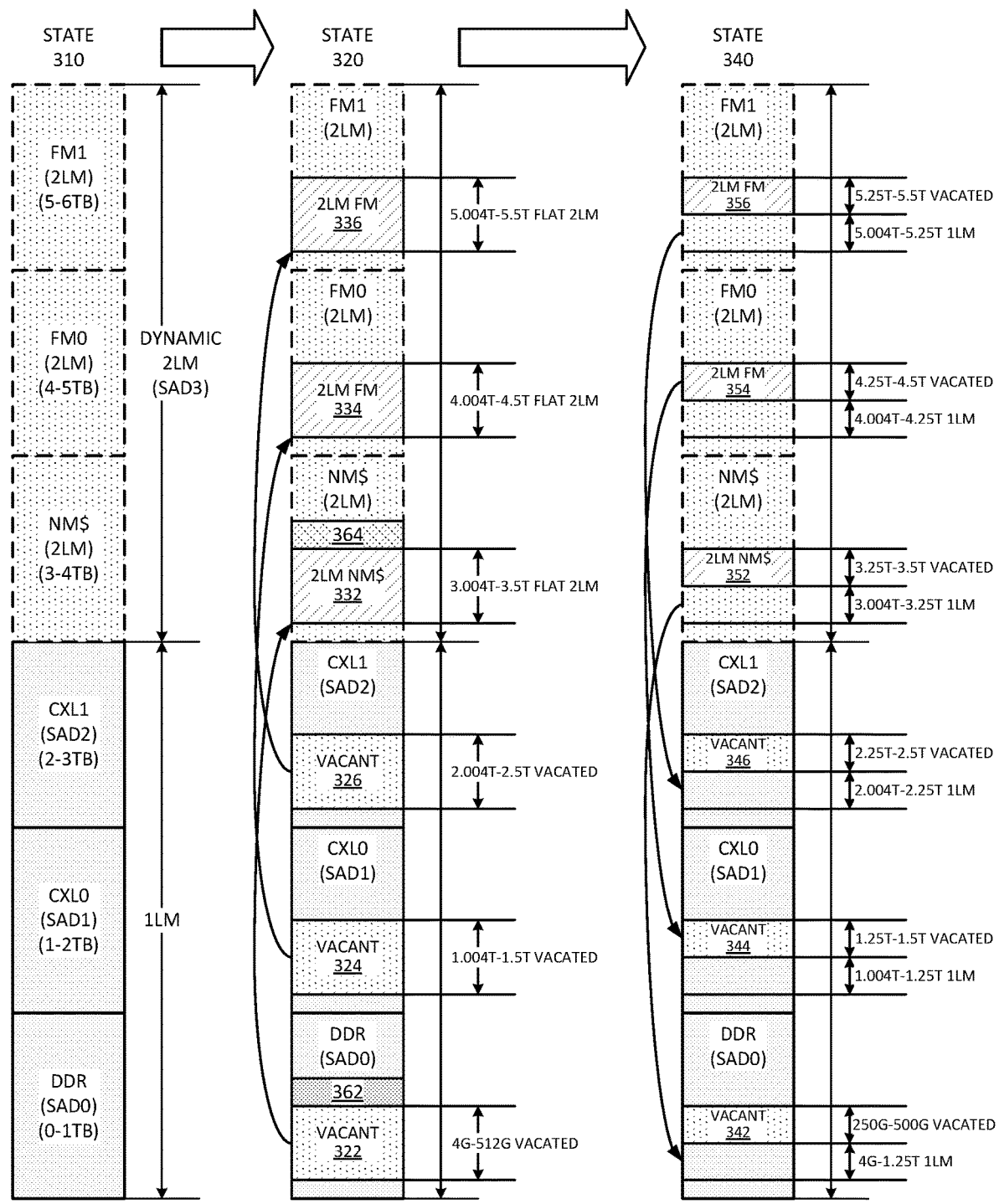
FIG. 3 is a block diagram of an example of dynamic allocation between 1LM and 2LM.

FIG. 3 is a block diagram of an example of dynamic allocation between 1LM and 2LM. State 310 represents a view of the system address map for the OS, once the system is booted from the BIOS to the OS. Thus, state 310 can represent a boot time address mapping for a system having the resources illustrated.

In one example, in state 310, the system has a 1LM region of addresses 0—3 TB. The 1LM region includes the physical memory resources, DDR memory as SAD0 (address space 0—1 TB), CXL0 as SAD1 (address space 1—2 TB), and CXL1 as SAD2 (address space 2—3 TB). The dynamic 2LM region is mapped as address space 3—6 TB, which includes 2LM or virtual regions. The virtual regions include NM$ (near memory cache) 2LM (address space 3—4 TB), FM0 (far memory zero) 2LM (address space 4—5 TB), and FM1 (far memory one) 2LM (address space 5—6 TB).

In a system with an OS that supports dynamic 2LM, the OS will be aware of the layout of the physical memory ranges based on programming by the BIOS. Thus, the OS will know the physical address space as well as the dynamic 2LM region and the non-existent memory devices behind the 2LM region from a hardware point of view. In one example, the BIOS indicates the system layout to the OS through a ACPI The presence of the dynamic 2LM capability and the region map is indicated by system BIOS to OS with a property in a configuration communication, such as in a data structure definition of a configuration communication of an ACPI (advanced configuration and power interface) standard. For example, the data structure can include information about interleave sets configured for CXL devices. The OS can include an ACPI table with information showing one or more mappings of the address space.

Consider during runtime that the OS decides to migrate certain pages from 1LM to 2LM. State 320 represents the migration from state 310. As illustrated, in state 320, the OS creates vacant regions in the 1LM space, region 322 in DDR SAD0, region 324 in CXL0 SAD1, and region 326 in CXL1 SAD2. The vacated regions are specified in the diagram as 4 GB to 512 GB, 1.004 TB to 1.5 TB, and 2.004 TB to 2.5 TB, respectively.

The OS can also allocate corresponding address space regions in the 2LM address space. In state 320, the OS creates 2LM NM$ 332 corresponding to region 322, 2LM FM 334 corresponding to region 324, and 2LM FM 336 corresponding to region 326. Thus, the OS can allocate regions specified in the diagram as 3.004 TB to 3.5 TB, 4.004 TB to 4.5 TB, and 5.004 TB to 5.5 TB, respectively.

Consider another example in state 320. In one example, the OS can pin certain regions to near memory, and not use them in a 2LM configuration. Thus, the OS can allocate an address space to a workload that will not be subject to being moved to 2LM. In state 320, in one example, region 362 represents a region allocated to 1LM, which will be prevented from being used in 2LM. Region 364 in NM$ is the corresponding region, which will be prevented from being used in 2LM.

To transition from state 310 to state 320 as a 1LM to 2LM runtime migration, in one example, the OS first vacates the address region that maps to the pages that are migrating from 1LM to 2LM. Vacating an address region refers to terminating all processes and applications currently running in the region or migrating them to different 1LM address regions. In one example, the OS or other system software is responsible for flushing all cache hierarchy for the addresses that belong to the vacant regions. The OS vacates the three regions illustrated (one in DDR, one in CXL0, and one in CXL1) because in flat2LM 1:2 ratio, there are three 2LM regions: NM$ region that maps to DDR, FM0 that maps to CXL0, and FM1 that maps to CXL1.

In one example, once the vacating competes, the virtual address space in the 2LM regions will become active flat2LM regions. An access to the flat2LM addresses emitted from a processing core to the home agent will be decoded by SAD3 as a 2LM transaction and will be routed to the DDR channel for NM$ access. In one example, in the native DDR, TAD1 decodes the address to 2LM set address and fetches content from the DDR device. It will be understood that the set address is mapped to the same DRAM location as the previous 1LM address, but since the content in the location has been vacated by the OS and the 1LM system address is mapped out by OS as allocatable memory addresses, it is safe to use the DRAM addresses now as NM$. In one example, the NM$ controller manages miss/hit between the addresses in the three 2LM regions.

The transition from state 320 to state 340 illustrates the opposite flow. In one example, the OS decides to map one or more pages from 2LM address space back to 1LM address space. The OS can migrate all or some of what has been mapped from 1LM address space to 2LM address space.

As illustrated, the OS maps address space 3.004 TB to 3.25 TB from NM$ to DDR SAD0 4 GB to 1.25 TB, leaving 250 GB to 500 GB as vacant region 342 in DDR. As such, the OS leaves 2LM NM$ 3.25 to 3.5 TB as region 352. The OS also maps address space 4.004 TB to 4.25 TB from FM0 to CXL0 SAD1 1.004 to 1.25 TB, leaving 1.25 to 1.5 TB as vacant region 344 in CXL0. As such, the OS leaves 2LM FM0 4.25 to 4.5 TB as region 354 in FM0. The OS also maps address space 5.004 TB to 5.25 TB from FM1 to CXL1 SAD2 3.004 to 3.25 TB, leaving 3.25 to 3.5 TB as vacant region 346 in CXL1. As such, the OS leaves 2LM FM1 5.25 to 5.5 TB as region 356 in FM1.

Figure 4:
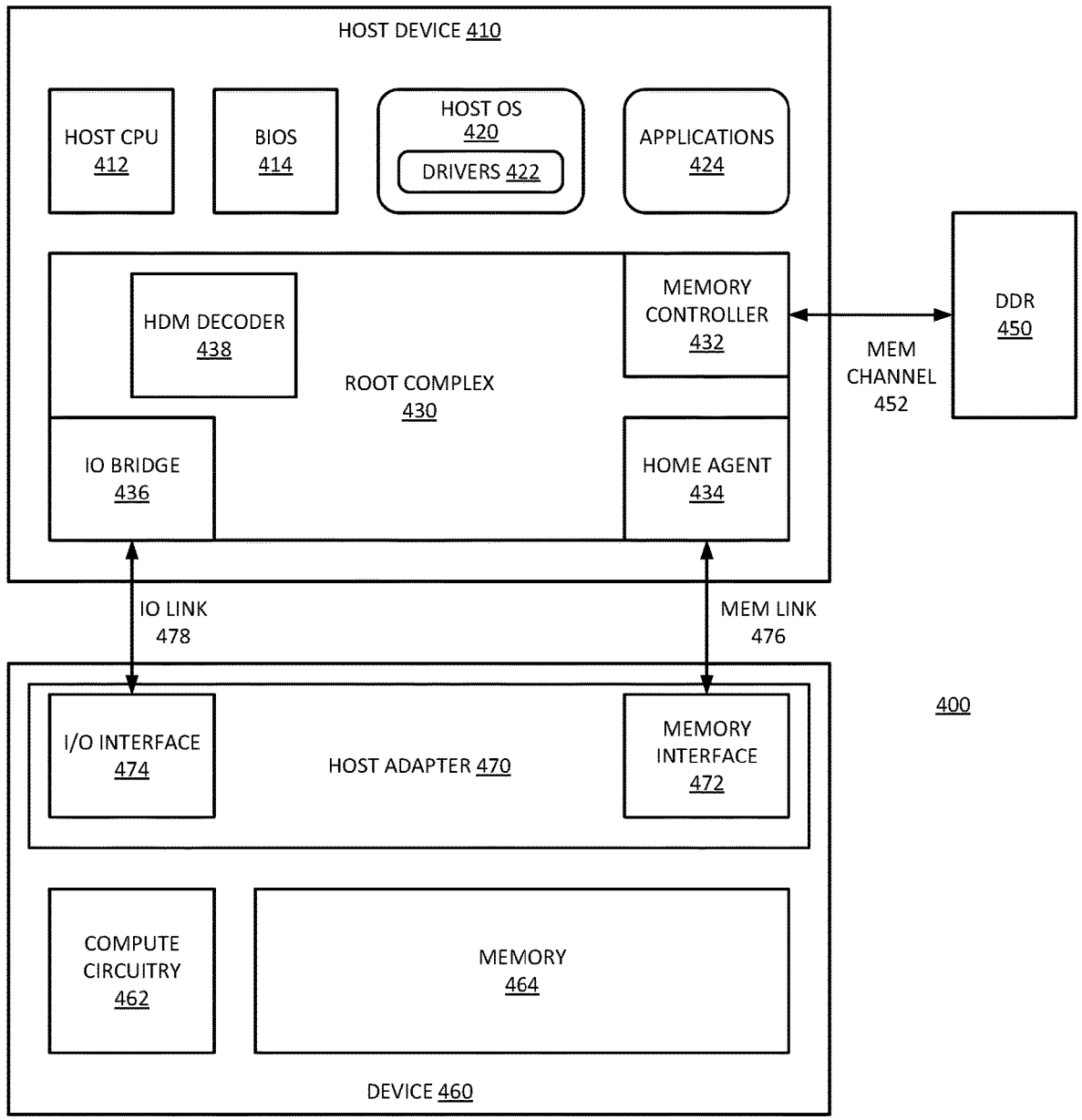
FIG. 4 is a block diagram of an example of a system that can implement dynamic 2LM with CXL-based memory.

FIG. 4 is a block diagram of an example of a system that can implement dynamic 2LM with CXL-based memory. System 400 includes host device 410 coupled to device 460 via one or more CXL links. Host device 410 represents a host compute device such as a processor or a computing device. Device 460 includes memory 464, which can be made available for use by host device 410 through the link or links.

Host device 410 includes host central processing unit (CPU) 412 or other host processor to execute instructions and perform computations in system 400. Host device 410 includes BIOS 414, which can manage the memory configuration of host device 410. Host CPU 412 can execute host OS 420 and one or more host applications 424.

BIOS 414 can configure host OS 420 with memory configuration information as described above. More specifically, BIOS 414 can allocate both a 1LM memory configuration and a 2LM memory configuration for host OS 420 and allow the host to dynamically manage memory for either 1LM or 2LM operation, based on the needs of the workloads executed by host CPU 412.

Host OS 420 can execute drivers 422, which represent device drivers to manage hardware components and peripherals in host device 410. Applications 424 represent software programs and processes in host device 410. Execution of applications 424 represents the workloads executed in host device 410. The execution of host OS 420 and applications 424 generates memory access requests.

System 400 includes main system memory, such as DDR 450. DDR 450 represents volatile memory resources native to host device 410. In one example, DDR 450 could be considered part of host device 410. Host device 410 couples to DDR 450 via one or more memory (MEM) channels 452. Memory controller 432 of host device 410 manages access by the host device to DDR 450.

In one example, memory controller 432 is part of host CPU 412 as an integrated memory controller. In one example, memory controller 432 is part of root complex 430, which generally manages memory access for host device 410. In one example, root complex 430 is part of host CPU 412, with components integrated onto the processor die or processor system on a chip. Root complex 430 can provide one or more communication interfaces for host CPU 412, such as PCIe.

In one example, host 410 includes root complex 430 to couple with device 460 through one or links or network connections. Memory (MEM) link 476 represents an example of a CXL memory transaction link or CXL.mem transaction link. IO (input/output) link 478 represents an example of a CXL IO transaction link or CXL.io transaction link. In one example, root complex 430 includes home agent 434 to manage memory link 476. In one example, root complex 430 includes IO bridge 436 to manage IO link 478.

IO bridge 436 can include an IO memory management unit (IOMMU) to manage communication with device 460 via IO link 478. In one example, root complex 430 includes host-managed device memory (HDM) decoders 438 to provide a mapping of host to device physical addresses for use in system memory (e.g., pooled system memory). In one example, BIOS 414 programs HDM decoders 438 to enable dynamic 2LM operation in accordance with any example described.

In one example, device 460 includes host adapter 470, which represents adapter circuitry to manage the links with host device 410. Device 460 can include memory 464 as a device memory, which can be memory resources provided to host device 410. Device 460 can include compute circuitry 462, which can be compute circuitry to manage device 460 and provide memory compute offload for host device 410.

Host adapter 470 includes memory interface 472 as memory transaction logic to manage communication with elements of root complex 430, such as home agent 434, via memory link 476. Host adapter 470 includes IO interface 474 to manage communication with elements of root complex 430, such as IO bridge 436, via IO link 478. In one example, host adapter 470 can be integrated with compute circuitry, being on the same chip or die as the compute circuitry. In one example, host adapter 470 is separate from compute circuitry 462. In one example, memory interface 472 and IO interface 474 can expose portions of device memory 464 to host device 410. Host device 410 can map to the portions of memory 464 as part of a 1LM configuration or a dynamic 2LM configuration, in accordance with any example described.

Figure 5:
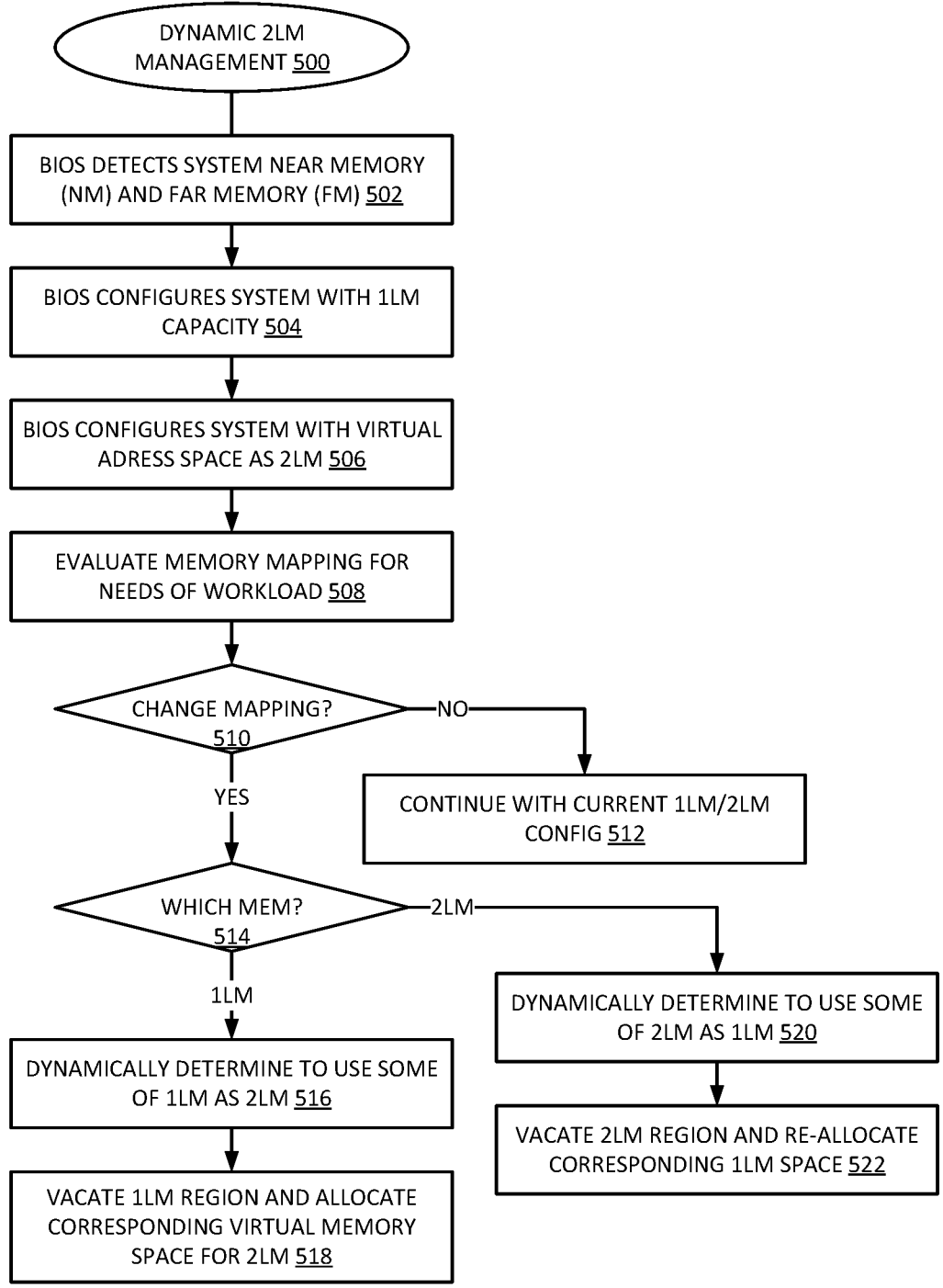
FIG. 5 is a flow diagram of an example of a process for dynamic multilevel memory allocation.

FIG. 5 is a flow diagram of an example of a process for dynamic multilevel memory allocation. Process 500 represents a process for dynamic management of 2LM memory usage. Process 500 can represent a process applied by an example of system 100, system 200, or system 400.

In one example, a BIOS detects the system near memory (NM) resources and system far memory (FM) resources, at 502. In one example, the BIOS configures the system with 1LM capacity as the physical memory available to the system, at 504. In one example, the BIOS configures the system with virtual address space for dynamic 2LM, at 506. The use of the virtual address space configures the system with both 1LM and 2LM configurations, enabling the host OS to dynamically allocate memory usage in a way that is best for the system workloads.

In one example, the OS evaluates the current memory mapping relative to the needs of a workload that needs memory space allocated, at 508. The OS can perform the evaluation determine whether to change the memory mapping in the system. If the OS does not change the mapping, at 510 NO branch, the system can continue with the current 1LM/2LM configuration, at 512.

If the OS changes the mapping, at 510 YES branch, in one example, the OS can determine what memory mapping change to make to the system. If the OS determines to change the 1LM mapping, at 514 1LM branch, the OS can dynamically determine to use some of the memory mapped to 1LM as 2LM memory, at 516. To make the change, the OS can vacate the 1LM region and allocate the corresponding virtual memory space for 2LM, at 518.

If the OS determines to change the 2LM mapping, at 514 2LM branch, the OS can dynamically determine to use some of the memory mapped to 2LM as 1LM memory, at 520. To make the change, the OS can vacate the 2LM region and re-allocate the corresponding virtual memory space to 1LM, at 522.

Figure 6:
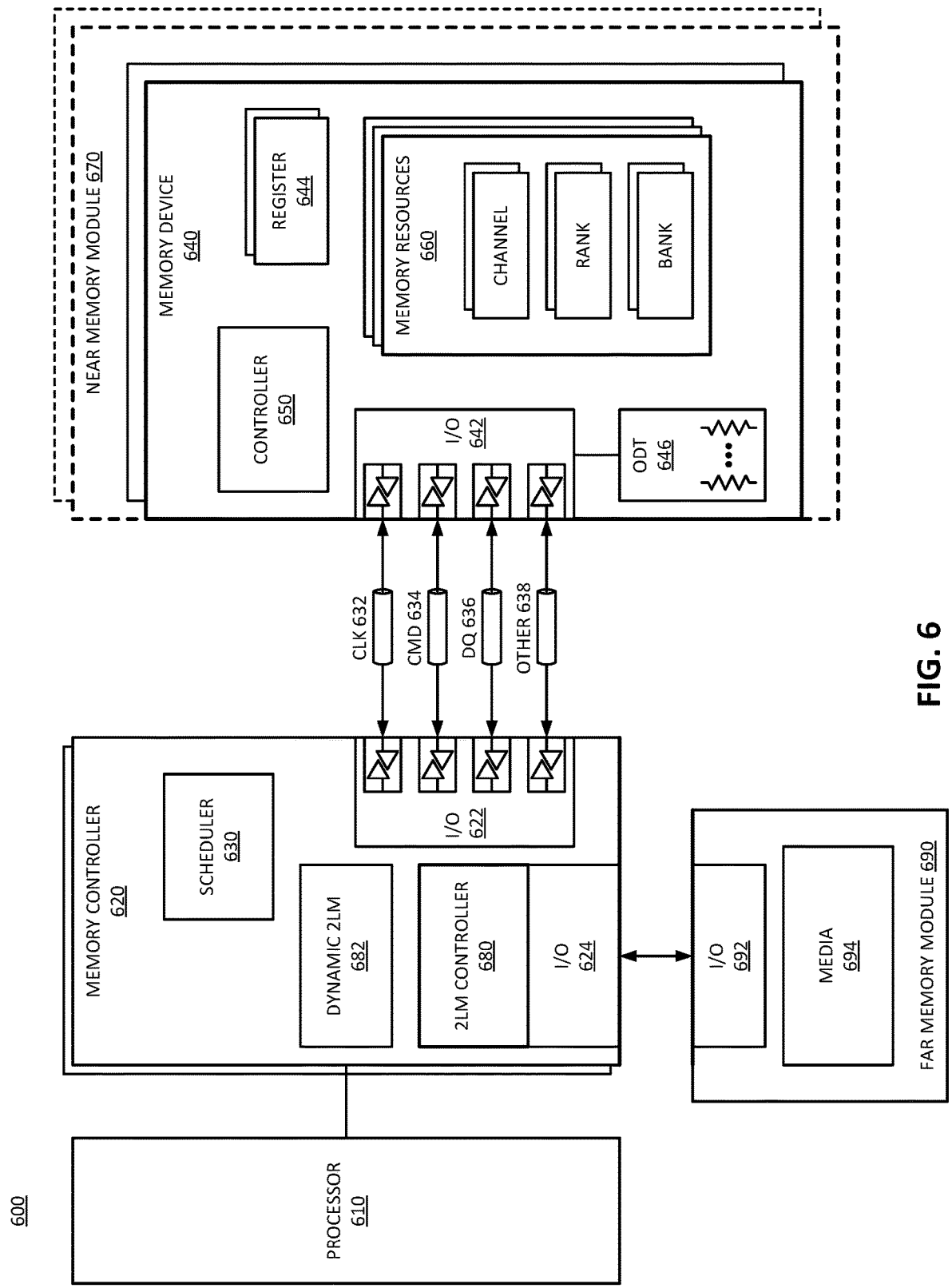
FIG. 6 is a block diagram of an example of a memory subsystem in which dynamic 2LM can be implemented.

FIG. 6 is a block diagram of an example of a memory subsystem in which dynamic 2LM can be implemented. System 600 includes a processor and elements of a memory subsystem in a computing device.

System 600 can operate as a dynamic 2LM system with far memory module 690 having a longer access delay than near memory module 670. In one example, memory controller 620 includes 2LM controller 680. 2LM controller 680 can access far memory module 690 via I/O (input/output) 624, which can be or include CXL links and associated controllers. In one example, 2LM controller 680 is a subset of scheduler 630. In one example, memory controller 620 includes dynamic 2LM 682, which represents logic to dynamically map 1LM and 2LM memory address spaces in response to a decision by an operating system.

Far memory module 690 includes I/O 692 to interface with I/O 624. Far memory module 690 includes media 694, which represents the storage media of module 690. In one example, media 694 is nonvolatile media. In one example, media 694 can include volatile memory media.

Processor 610 represents a processing unit of a computing platform that may execute an operating system (OS) and applications, which can collectively be referred to as the host or the user of the memory. The OS and applications execute operations that result in memory accesses. Processor 610 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 600 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, JESD79-5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 620 represents one or more memory controller circuits or devices for system 600. Memory controller 620 represents control logic that generates memory access commands in response to the execution of operations by processor 610. Memory controller 620 accesses one or more memory devices 640. Memory devices 640 can be DRAM devices in accordance with any referred to above. In one example, memory devices 640 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 620 manages a separate memory channel, although system 600 can be configured to have multiple channels managed by a single controller, or to have multiple controllers on a single channel. In one example, memory controller 620 is part of host processor 610, such as logic implemented on the same die or implemented in the same package space as the processor.

Memory controller 620 includes I/O interface logic 622 to couple to a memory bus, such as a memory channel as referred to above. I/O interface logic 622 (as well as I/O interface logic 642 of memory device 640) can include pins, pads, connectors, signal lines, traces, or wires, or other hardware to connect the devices, or a combination of these. I/O interface logic 622 can include a hardware interface. As illustrated, I/O interface logic 622 includes at least drivers/transceivers for signal lines. Commonly, wires within an integrated circuit interface couple with a pad, pin, or connector to interface signal lines or traces or other wires between devices. I/O interface logic 622 can include drivers, receivers, transceivers, or termination, or other circuitry or combinations of circuitry to exchange signals on the signal lines between the devices. The exchange of signals includes at least one of transmit or receive. While shown as coupling I/O 622 from memory controller 620 to I/O 642 of memory device 640, it will be understood that in an implementation of system 600 where groups of memory devices 640 are accessed in parallel, multiple memory devices can include I/O interfaces to the same interface of memory controller 620. In an implementation of system 600 including one or more memory modules 670, I/O 642 can include interface hardware of the memory module in addition to interface hardware on the memory device itself. Other memory controllers 620 will include separate interfaces to other memory devices 640.

The bus between memory controller 620 and memory devices 640 can be implemented as multiple signal lines coupling memory controller 620 to memory devices 640. The bus may typically include at least clock (CLK) 632, command/address (CMD) 634, and write data (DQ) and read data (DQ) 636, and zero or more other signal lines 638. In one example, a bus or connection between memory controller 620 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 600 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 620 and memory devices 640. An example of a serial bus technology is 8B10B encoding and transmission of high-speed data with embedded clock over a single differential pair of signals in each direction. In one example, CMD 634 represents signal lines shared in parallel with multiple memory devices. In one example, multiple memory devices share encoding command signal lines of CMD 634, and each has a separate chip select (CS_n) signal line to select individual memory devices.

It will be understood that in the example of system 600, the bus between memory controller 620 and memory devices 640 includes a subsidiary command bus CMD 634 and a subsidiary bus to carry the write and read data, DQ 636. In one example, the data bus can include bidirectional lines for read data and for write/command data. In another example, the subsidiary bus DQ 636 can include unidirectional write signal lines for write and data from the host to memory, and can include unidirectional lines for read data from the memory to the host. In accordance with the chosen memory technology and system design, other signals 638 may accompany a bus or sub bus, such as strobe lines DQS. Based on design of system 600, or implementation if a design supports multiple implementations, the data bus can have more or less bandwidth per memory device 640. For example, the data bus can support memory devices that have either a x32 interface, a x16 interface, a x8 interface, or other interface. The convention "xW," where W is an integer that refers to an interface size or width of the interface of memory device 640, which represents a number of signal lines to exchange data with memory controller 620. The interface size of the memory devices is a controlling factor on how many memory devices can be used concurrently per channel in system 600 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 640 and memory controller 620 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 640 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 640 represent memory resources for system 600. In one example, each memory device 640 is a separate memory die. In one example, each memory device 640 can interface with multiple (e.g., 2) channels per device or die. Each memory device 640 includes I/O interface logic 642, which has a bandwidth determined by the implementation of the device (e.g., x16 or x8 or some other interface bandwidth). I/O interface logic 642 enables the memory devices to interface with memory controller 620. I/O interface logic 642 can include a hardware interface, and can be in accordance with I/O 622 of memory controller, but at the memory device end. In one example, multiple memory devices 640 are connected in parallel to the same command and data buses. In another example, multiple memory devices 640 are connected in parallel to the same command bus, and are connected to different data buses. For example, system 600 can be configured with multiple memory devices 640 coupled in parallel, with each memory device responding to a command, and accessing memory resources 660 internal to each. For a Write operation, an individual memory device 640 can write a portion of the overall data word, and for a Read operation, an individual memory device 640 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word will be provided or received by other memory devices in parallel.

In one example, memory devices 640 are disposed directly on a motherboard or host system platform (e.g., a PCB (printed circuit board) on which processor 610 is disposed) of a computing device. In one example, memory devices 640 can be organized into memory modules 670. In one example, memory modules 670 represent dual inline memory modules (DIMMs). In one example, memory modules 670 represent other organization of multiple memory devices to share at least a portion of access or control circuitry, which can be a separate circuit, a separate device, or a separate board from the host system platform. Memory modules 670 can include multiple memory devices 640, and the memory modules can include support for multiple separate channels to the included memory devices disposed on them. In another example, memory devices 640 may be incorporated into the same package as memory controller 620, such as by techniques such as multi-chip-module (MCM), package-on-package, through-silicon via (TSV), or other techniques or combinations. Similarly, in one example, multiple memory devices 640 may be incorporated into memory modules 670, which themselves may be incorporated into the same package as memory controller 620. It will be appreciated that for these and other implementations, memory controller 620 may be part of host processor 610.

Memory devices 640 each include memory resources 660. Memory resources 660 represent individual arrays of memory locations or storage locations for data. Typically memory resources 660 are managed as rows of data, accessed via wordline (rows) and bitline (individual bits within a row) control. Memory resources 660 can be organized as separate channels, ranks, and banks of memory. Channels may refer to independent control paths to storage locations within memory devices 640. Ranks may refer to common locations across multiple memory devices (e.g., same row addresses within different devices). Banks may refer to arrays of memory locations within a memory device 640. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 640 include one or more registers 644. Register 644 represents one or more storage devices or storage locations that provide configuration or settings for the operation of the memory device. In one example, register 644 can provide a storage location for memory device 640 to store data for access by memory controller 620 as part of a control or management operation. In one example, register 644 includes one or more Mode Registers. In one example, register 644 includes one or more multipurpose registers. The configuration of locations within register 644 can configure memory device 640 to operate in different "modes," where command information can trigger different operations within memory device 640 based on the mode. Additionally or in the alternative, different modes can also trigger different operation from address information or other signal lines depending on the mode. Settings of register 644 can indicate configuration for I/O settings (e.g., timing, termination or ODT (on-die termination) 646, driver configuration, or other I/O settings).

In one example, memory device 640 includes ODT 646 as part of the interface hardware associated with I/O 642. ODT 646 can be configured as mentioned above, and provide settings for impedance to be applied to the interface to specified signal lines. In one example, ODT 646 is applied to DQ signal lines. In one example, ODT 646 is applied to command signal lines. In one example, ODT 646 is applied to address signal lines. In one example, ODT 646 can be applied to any combination of the preceding. The ODT settings can be changed based on whether a memory device is a selected target of an access operation or a non-target device. ODT 646 settings can affect the timing and reflections of signaling on the terminated lines. Careful control over ODT 646 can enable higher-speed operation with improved matching of applied impedance and loading. ODT 646 can be applied to specific signal lines of I/O interface 642, 622, and is not necessarily applied to all signal lines.

Memory device 640 includes controller 650, which represents control logic within the memory device to control internal operations within the memory device. For example, controller 650 decodes commands sent by memory controller 620 and generates internal operations to execute or satisfy the commands. Controller 650 can be referred to as an internal controller, and is separate from memory controller 620 of the host. Controller 650 can determine what mode is selected based on register 644, and configure the internal execution of operations for access to memory resources 660 or other operations based on the selected mode. Controller 650 generates control signals to control the routing of bits within memory device 640 to provide a proper interface for the selected mode and direct a command to the proper memory locations or addresses. Controller 650 includes command logic to decode command encoding received on command and address signal lines. Controller can identify commands and generate internal operations to execute requested commands.

Referring again to memory controller 620, memory controller 620 includes command logic to generate commands to send to memory devices 640. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 640, memory controller 620 can issue commands via I/O 622 to cause memory device 640 to execute the commands. In one example, controller 650 of memory device 640 receives and decodes command and address information received via I/O 642 from memory controller 620. Based on the received command and address information, controller 650 can control the timing of operations of the logic and circuitry within memory device 640 to execute the commands. Controller 650 is responsible for compliance with standards or specifications within memory device 640, such as timing and signaling requirements. Memory controller 620 can implement compliance with standards or specifications by access scheduling and control.

Memory controller 620 includes scheduler 630, which represents logic or circuitry to generate and order transactions to send to memory device 640. From one perspective, the primary function of memory controller 620 could be said to schedule memory access and other transactions to memory device 640. Such scheduling can include generating the transactions themselves to implement the requests for data by processor 610 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 620 typically includes logic such as scheduler 630 to allow selection and ordering of transactions to improve performance of system 600. Thus, memory controller 620 can select which of the outstanding transactions should be sent to memory device 640 in which order, which is typically achieved with logic much more complex that a simple first-in first-out algorithm. Memory controller 620 manages the transmission of the transactions to memory device 640, and manages the timing associated with the transaction. In one example, transactions have deterministic timing, which can be managed by memory controller 620 and used in determining how to schedule the transactions with scheduler 630.

Figure 7:
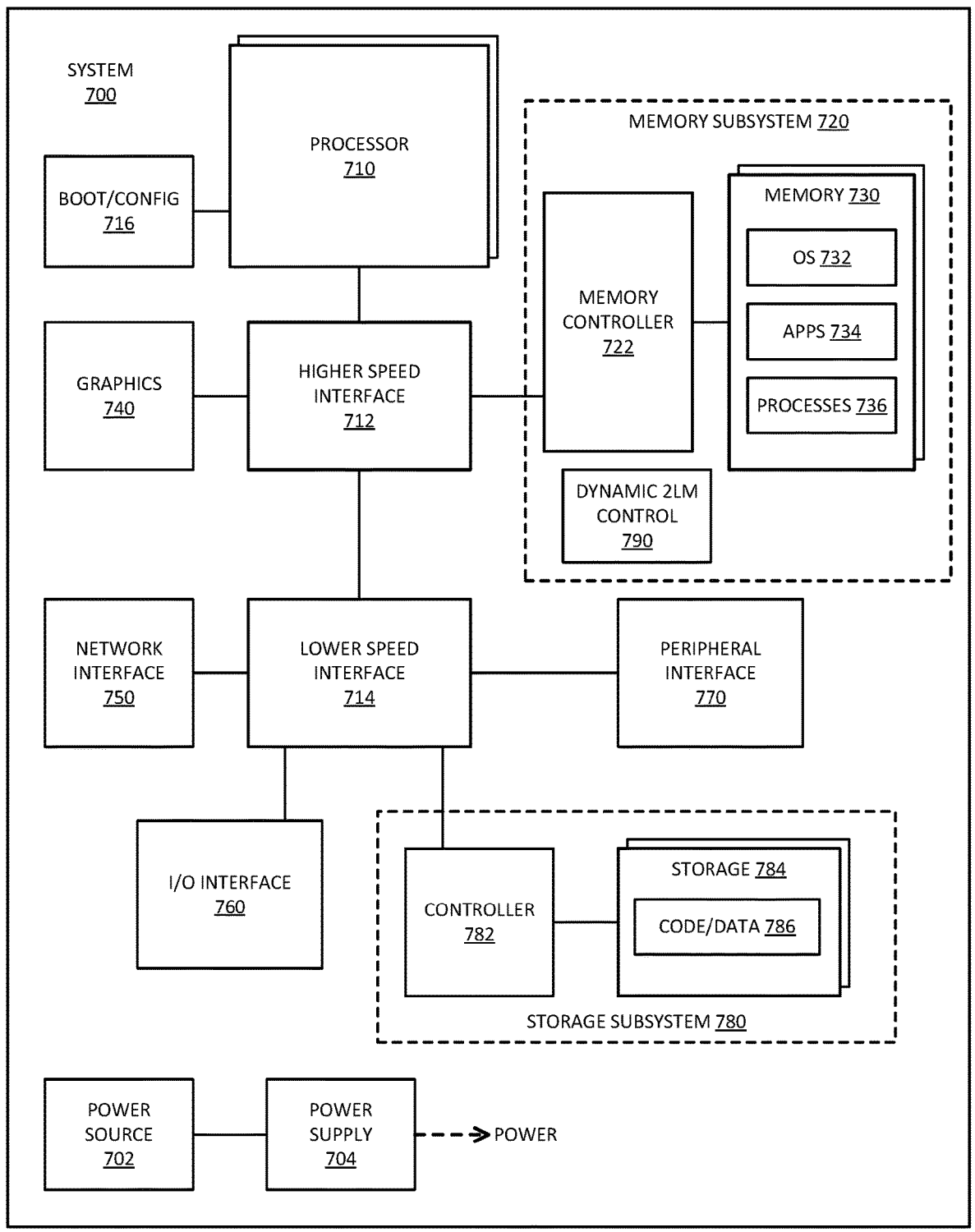
FIG. 7 is a block diagram of an example of a computing system in which dynamic 2LM can be implemented.

FIG. 7 is a block diagram of an example of a computing system in which dynamic 2LM can be implemented. System 700 represents a computing device in accordance with any example herein, and can be a laptop computer, a desktop computer, a tablet computer, a server, a gaming or entertainment control system, embedded computing device, or other electronic device.

System 700 represents a system in accordance with an example of system 100, an example of system 200, or an example of system 400. In one example, memory subsystem 720 includes dynamic 2LM control 790. In one example, BIOS/config 716 programs system 700 with both 1LM and 2LM configurations, enabling system 700 to provide memory address space that overlaps mapping to the same physical memory resources, which can include 1LM and 2LM devices. Dynamic 2LM control 790 enables system 700 to dynamically change the memory mapping of the system to change between use of memory in a 1LM configuration or a 2LM configuration during runtime, in accordance with any example herein.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, NAND, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
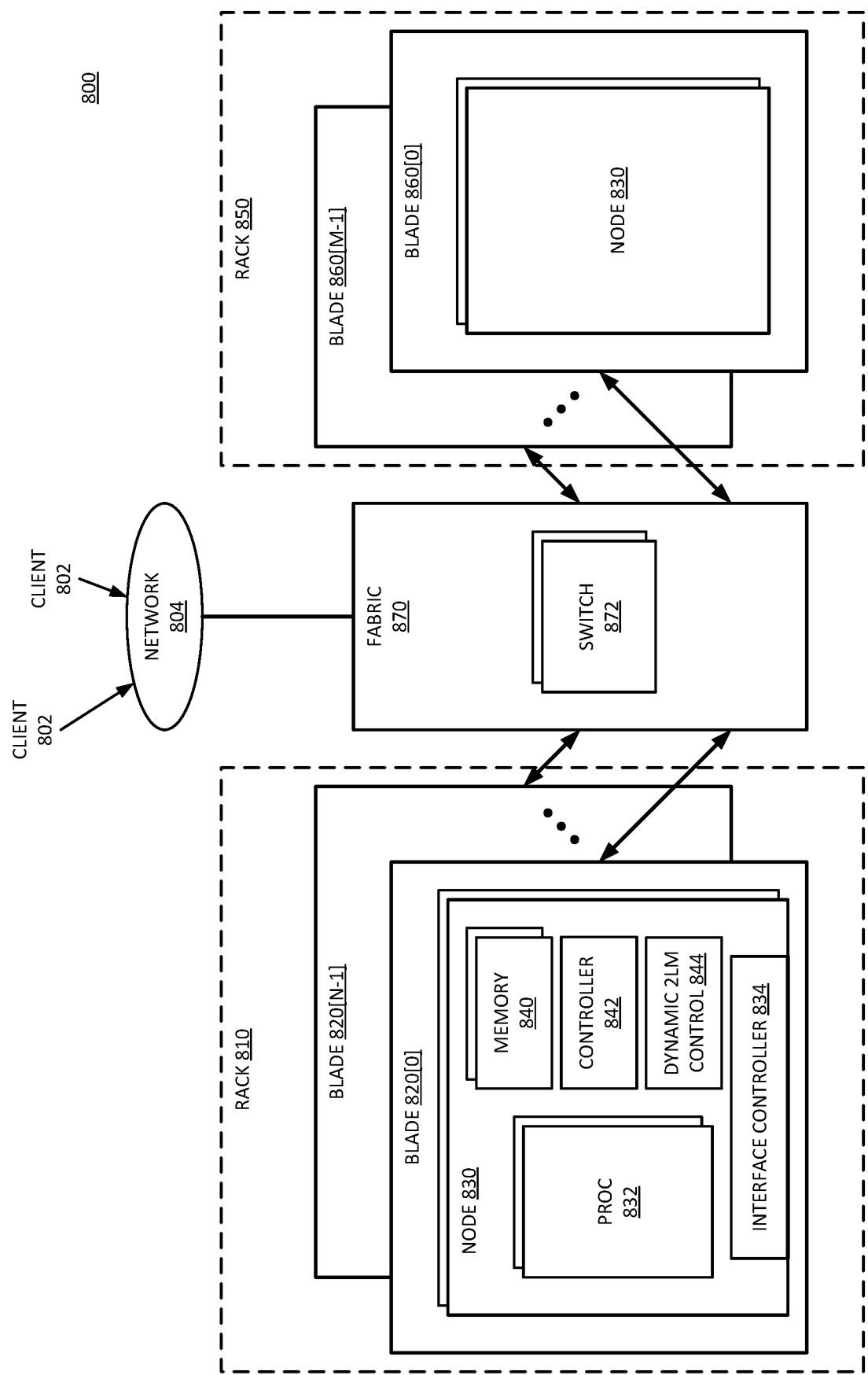
FIG. 8 is a block diagram of an example of a multi-node network in which dynamic 2LM can be implemented.

FIG. 8 is a block diagram of an example of a multi-node network in which dynamic 2LM can be implemented. System 800 represents a network of nodes that can apply adaptive ECC. In one example, system 800 represents a data center. In one example, system 800 represents a server farm. In one example, system 800 represents a data cloud or a processing cloud.

Node 830 represents a system in accordance with an example of system 100, an example of system 200, or an example of system 400. In one example, node 830 includes access to 1LM and 2LM memory resources. Memory 840 can represent both the 1LM and 2LM memory. Controller 842 represents a memory controller or other controller to access the memory resources. In one example, node 830 includes dynamic 2LM control 844. In one example, a BIOS programs node 830 with both 1LM and 2LM configurations, enabling the node to provide memory address space that overlaps mapping to the same physical memory resources, which can include 1LM and 2LM devices. Dynamic 2LM control 844 enables node 830 to dynamically change the memory mapping of the system to change between use of memory in a 1LM configuration or a 2LM configuration during runtime, in accordance with any example herein.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

For simplicity, only the node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840. A storage server refers to a node with more storage resources than a computation node, and rather than having processors for the execution of tasks, a storage server includes processing resources to manage access to the storage nodes within the storage server.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Node 830 can include memory devices represented by memory 840 and memory controller 842 to manage access to memory 840.

In general with respect to the descriptions herein, in one example an apparatus includes: a processor to execute an operating system (OS), the OS to manage a near memory (NM) space of size (N) and a far memory (FM) space of size (M); and a basic input output system (BIOS) to program a first memory address space of size P, where P equals N+M, to the NM space and the FM space, and to a program a second memory address space of size P to the NM space and the FM space; wherein for the first memory address space, the OS is to manage the NM space and the FM space as a flat memory space with an address space of size P available, and wherein for the second memory address space, the OS is to manage the NM space as a NM cache for FM, with an address space of size M available.

In one example of the apparatus, the BIOS is to program a source address decoder (SAD) with a first region of size N for the NM, a second region of size M for the FM, and a third region of size P for a combination of the NM and the FM. In accordance with any preceding example of the apparatus, in one example, the BIOS is to program a target address decoder (TAD) with a first region of size N for the NM, and a second region of size P, the second region having an address offset equal to P. In accordance with any preceding example of the apparatus, in one example, the OS is to map a first memory page to the first memory address space, and to map a second memory page to the second memory address space. In accordance with any preceding example of the apparatus, in one example, the OS is to migrate the first memory page at system runtime from the first memory address space to the second memory address space. In accordance with any preceding example of the apparatus, in one example, to migrate the first memory page to the second memory address space, the OS is to: vacate a first address region of the first memory address space that maps to the first memory page; allocate a second address region of the second memory address space; and map the first memory page to the second address region. In accordance with any preceding example of the apparatus, in one example, the OS is to migrate the second memory page at system runtime from the second memory address space to the first memory address space. In accordance with any preceding example of the apparatus, in one example, the near memory comprises double data rate (DDR) volatile memory. In accordance with any preceding example of the apparatus, in one example, the far memory comprises a memory device compatible with a compute express link standard.

In general with respect to the descriptions herein, in one example a system includes: a near memory device (NM) of size (N); a far memory device (FM) of size (M); a basic input output system (BIOS) to program a first memory address space of size P, where P equals N+M, including NM space for the NM and FM space for the FM, and to a program a second memory address space of size P including the NM space and the FM space; and a processor to execute an operating system (OS), wherein for the first memory address space, the OS is to manage the NM space and the FM space as a flat memory space with an address space of size P available, and wherein for the second memory address space, the OS is to manage the NM space as a NM cache for FM, with an address space of size M available.

In one example of the system, the BIOS is to program a source address decoder (SAD) with a first region of size N for the NM, a second region of size M for the FM, and a third region of size P for a combination of the NM and the FM. In accordance with any preceding example of the system, in one example, the BIOS is to program a target address decoder (TAD) with a first region of size N for the NM, and a second region of size P, the second region having an address offset equal to P. In accordance with any preceding example of the system, in one example, the OS is to map a first memory page to the first memory address space, and to map a second memory page to the second memory address space, wherein the OS is to migrate the first memory page at system runtime from the first memory address space to the second memory address space. In accordance with any preceding example of the system, in one example, to migrate the first memory page to the second memory address space, the OS is to: vacate a first address region of the first memory address space that maps to the first memory page; allocate a second address region of the second memory address space; and map the first memory page to the second address region. In accordance with any preceding example of the system, in one example, the OS is to map a first memory page to the first memory address space, and to map a second memory page to the second memory address space, wherein the OS is to migrate the second memory page at system runtime from the second memory address space to the first memory address space. In accordance with any preceding example of the system, in one example, the system includes one or more of: a host processor coupled to the memory controller; a display communicatively coupled to a host processor; a network interface communicatively coupled to a host processor; or a battery to power the system.

In general with respect to the descriptions herein, in one example a method for memory management includes: programming a first memory address space of size P, where P equals N+M, to a near memory (NM) space of size (N) and a far memory (FM) space of size (M); programming a second memory address space of size P to the NM space and the FM space; for the first memory address space, managing the NM space and the FM space as a flat memory space with an address space of size P available; and for the second memory address space, managing the NM space as a NM cache for FM, with an address space of size M available.

In one example, the method includes: programming a source address decoder (SAD) with a first region of size N for the NM, a second region of size M for the FM, and a third region of size P for a combination of the NM and the FM; and programming a target address decoder (TAD) with a first region of size N for the NM, and a second region of size P, the second region having an address offset equal to P. In accordance with any preceding example of the method, in one example, the method includes: migrating a first memory page at system runtime from the first memory address space to the second memory address space. In accordance with any preceding example of the method, in one example, the method includes: migrating a first memory page at system runtime from the second memory address space to the first memory address space.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a processor to execute an operating system (OS), the OS to manage a near memory (NM) space of size (N) and a far memory (FM) space of size (M); and
a basic input output system (BIOS) to program a first memory address space of size P, where P equals N+M, to the NM space and the FM space, and to a program a second memory address space of size P to the NM space and the FM space;
wherein for the first memory address space, the OS is to manage the NM space and the FM space as a flat memory space in a one-level memory (1LM) configuration with an address space of size P available, and wherein for the second memory address space, the OS is to manage the NM space as a NM cache for FM in a two-level memory (2LM) configuration, with an address space of size M available, wherein the OS is to dynamically change between the 1LM configuration and the 2LM configuration at runtime; and
wherein the BIOS is to program a target address decoder (TAD) with a first region of size N for the NM, and a second region of size P, the second region having an address offset equal to P.

2. The apparatus of claim 1, wherein the BIOS is to program a source address decoder (SAD) with a first region of size N for the NM, a second region of size M for the FM, and a third region of size P for a combination of the NM and the FM.

3. The apparatus of claim 1, wherein the OS is to map a first memory page to the first memory address space, and to map a second memory page to the second memory address space.

4. The apparatus of claim 3, wherein the OS is to migrate the first memory page at system runtime from the first memory address space to the second memory address space.

5. The apparatus of claim 4, wherein to migrate the first memory page to the second memory address space, the OS is to:
vacate a first address region of the first memory address space that maps to the first memory page;
allocate a second address region of the second memory address space; and
map the first memory page to the second address region.

6. The apparatus of claim 3, wherein the OS is to migrate the second memory page at system runtime from the second memory address space to the first memory address space.

7. The apparatus of claim 1, wherein the near memory comprises double data rate (DDR) volatile memory.

8. The apparatus of claim 1, wherein the far memory comprises a memory device compatible with a compute express link standard.

9. A system comprising:
a near memory device (NM) of size (N);
a far memory device (FM) of size (M);
a basic input output system (BIOS) to program a first memory address space of size P, where P equals N+M, including NM space for the NM and FM space for the FM, and to a program a second memory address space of size P including the NM space and the FM space; and
a processor to execute an operating system (OS), wherein for the first memory address space, the OS is to manage the NM space and the FM space as a flat memory space in a one-level memory (1LM) configuration with an address space of size P available, and wherein for the second memory address space, the OS is to manage the NM space as a NM cache for FM in a two-level memory (2LM) configuration, with an address space of size M available, wherein the OS is to dynamically change between the 1LM configuration and the 2LM configuration at runtime;
wherein the BIOS is to program a target address decoder (TAD) with a first region of size N for the NM, and a second region of size P, the second region having an address offset equal to P.

10. The system of claim 9, wherein the BIOS is to program a source address decoder (SAD) with a first region of size N for the NM, a second region of size M for the FM, and a third region of size P for a combination of the NM and the FM.

11. The system of claim 9, wherein the OS is to map a first memory page to the first memory address space, and to map a second memory page to the second memory address space, wherein the OS is to migrate the first memory page at system runtime from the first memory address space to the second memory address space.

12. The system of claim 11, wherein to migrate the first memory page to the second memory address space, the OS is to:
vacate a first address region of the first memory address space that maps to the first memory page;
allocate a second address region of the second memory address space; and
map the first memory page to the second address region.

13. The system of claim 9, wherein the OS is to map a first memory page to the first memory address space, and to map a second memory page to the second memory address space, wherein the OS is to migrate the second memory page at system runtime from the second memory address space to the first memory address space.

14. The system of claim 9, including one or more of:
a host processor coupled to a memory controller;
a display communicatively coupled to a host processor;
a network interface communicatively coupled to a host processor; or
a battery to power the system.

15. A method for memory management, comprising:
programming a first memory address space of size P, where P equals N+M, to a near memory (NM) space of size (N) and a far memory (FM) space of size (M);
programming a second memory address space of size P to the NM space and the FM space;
programming a target address decoder (TAD) with a first region of size N for the NM, and a second region of size P, the second region having an address offset equal to P;
for the first memory address space, managing the NM space and the FM space as a flat memory space in a one-level memory (1LM) configuration with an address space of size P available;
for the second memory address space, managing the NM space as a NM cache for FM in a two-level memory (2LM) configuration, with an address space of size M available; and
dynamically changing between the 1LM configuration and the 2LM configuration at runtime.

16. The method of claim 15, further comprising:
programming a source address decoder (SAD) with a first region of size N for the NM, a second region of size M for the FM, and a third region of size P for a combination of the NM and the FM.

17. The method of claim 15, further comprising:
migrating a first memory page at system runtime from the first memory address space to the second memory address space.

18. The method of claim 15, further comprising:
migrating a first memory page at system runtime from the second memory address space to the first memory address space.

* * * * *